United States Patent
Ishizawa

(10) Patent No.: US 9,586,867 B2
(45) Date of Patent: Mar. 7, 2017

(54) $CAF_2$ TRANSLUCENT CERAMICS AND MANUFACTURING METHOD OF $CAF_2$ TRANSLUCENT CERAMICS

(71) Applicant: NIKON CORPORATION, Tokyo (JP)

(72) Inventor: Hitoshi Ishizawa, Kawasaki (JP)

(73) Assignee: NIKON CORPORATION, Tokyo (JP)

( * ) Notice: Subject to any disclaimer, the term of this patent is extended or adjusted under 35 U.S.C. 154(b) by 30 days.

(21) Appl. No.: 14/269,728

(22) Filed: May 5, 2014

(65) Prior Publication Data

US 2014/0239228 A1  Aug. 28, 2014

Related U.S. Application Data

(63) Continuation of application No. PCT/JP2012/079548, filed on Nov. 14, 2012.

(30) Foreign Application Priority Data

Nov. 17, 2011 (JP) .................. 2011-251549

(51) Int. Cl.
- C09K 11/77 (2006.01)
- C04B 35/553 (2006.01)

(Continued)

(52) U.S. Cl.
CPC ........ *C04B 35/553* (2013.01); *B29D 11/0074* (2013.01); *B82Y 30/00* (2013.01); *C01F 11/22* (2013.01); *C04B 35/6455* (2013.01); *C09K 11/779* (2013.01); *C09K 11/7731* (2013.01); *C09K 11/7733* (2013.01); *C09K 11/7772* (2013.01); *C09K 11/7773* (2013.01); *C09K 11/7774* (2013.01); *C09K 11/7791* (2013.01); *H05B 33/145* (2013.01); *C01P 2002/52* (2013.01); *C01P 2002/84* (2013.01); *C01P 2004/04* (2013.01); *C01P 2004/62* (2013.01); *C01P 2004/64* (2013.01); *C01P 2006/60* (2013.01); *C04B 2235/3208* (2013.01);

(Continued)

(58) Field of Classification Search
None
See application file for complete search history.

(56) References Cited

U.S. PATENT DOCUMENTS

| 8,206,679 | B2 | 6/2012 | Ishizawa |
| 2004/0027700 | A1 * | 2/2004 | Yoshida ................ C03C 17/007 359/883 |

(Continued)

FOREIGN PATENT DOCUMENTS

| CN | 101697367 A * | 4/2010 | ........... C04B 35/443 |
| CN | 101896441 | 11/2010 | |

(Continued)

OTHER PUBLICATIONS

Machine translation of JP2006206359, printed Oct. 29, 2015.*

(Continued)

*Primary Examiner* — Matthew E Hoban
*Assistant Examiner* — Lynne Edmondson

(57) ABSTRACT

$CaF_2$ translucent ceramics includes at least two rare earth elements selected from a group consisting of La, Pr, Nd, Sm, Eu, Tb, Dy, Ho, Er, Tm, Yb, and Lu.

17 Claims, 7 Drawing Sheets

(51) Int. Cl.
   *C04B 35/645* (2006.01)
   *C01F 11/22* (2006.01)
   *H05B 33/14* (2006.01)
   *B29D 11/00* (2006.01)
   *B82Y 30/00* (2011.01)

(52) U.S. Cl.
   CPC ............ *C04B 2235/3224* (2013.01); *C04B 2235/3227* (2013.01); *C04B 2235/445* (2013.01); *C04B 2235/549* (2013.01); *C04B 2235/5436* (2013.01); *C04B 2235/5445* (2013.01); *C04B 2235/5454* (2013.01); *C04B 2235/668* (2013.01); *C04B 2235/9653* (2013.01)

(56) References Cited

U.S. PATENT DOCUMENTS

| | | | | |
|---|---|---|---|---|
| 2010/0323878 | A1* | 12/2010 | Ishizawa | C04B 35/6263 501/151 |
| 2011/0063592 | A1* | 3/2011 | Ezura | C09K 11/7748 355/53 |
| 2012/0178193 | A1* | 7/2012 | Lei | C04B 35/443 438/27 |

FOREIGN PATENT DOCUMENTS

| | | |
|---|---|---|
| JP | 2-289422 | 11/1990 |
| JP | 2006206359 A * | 8/2006 |
| JP | 2011-20917 | 2/2011 |
| JP | 4747587 | 8/2011 |
| TW | 200940684 | 10/2009 |
| WO | 2009/075361 | 6/2009 |
| WO | 2009/113544 | 9/2009 |
| WO | 2009/154193 | 12/2009 |

OTHER PUBLICATIONS

Karimov et al., "Investigation of Multicomponent Fluoride Optical Materials in the UV Spectral Region: I. Single Crystals of $Ca_{1-x}R_xF_{2+x}$ (R=Sc, Y, La, Yb, Lu) Solid Solutions", 2006, Crystallography Reports, vol. 51, No. 6, pp. 1009-1015.*
Kaminskii et al., "New crystal laser utilizing disordered fluoride crystals activated with $Nd^{3+}$ ions pumped by semiconductor laser radiation", Feb. 1992, Sov. J. Quantum Electron, 22 (2), pp. 95-96.*
Aminov et al., "EPR of $Yb^{3+}$ Ions in $Ba_{1-x}La_xF_{2+x}$ Mixed Crystals", 2005, Appl. Magn. Reson. 28, pp. 41-53.*
International Search Report mailed Feb. 26, 2013 in corresponding International Patent Application No. PCT/JP2012/079548.
Office Action mailed May 19, 2015 in corresponding Japanese Patent Application No. 2013-544306.
PCT Written Opinion of the International Searching Authority mailed Feb. 26, 2013 in corresponding International Patent Application No. PCT/JP2012/079548.
Office Action mailed Jan. 23, 2015 in corresponding Chinese Patent Application No. 201280052080.4.
Chinese Office Action dated Mar. 2, 2016 from corresponding Chinese Patent Application No. 201280052080.4, 17 pages.

* cited by examiner

CAF₂ TRANSLUCENT CERAMICS AND MANUFACTURING METHOD OF CAF₂ TRANSLUCENT CERAMICS

CROSS-REFERENCE TO RELATED APPLICATION

This is a Continuation Application of International Application No. PCT/JP2012/79548, filed on Nov. 14, 2012, which claims priority on Japanese Patent Application No. 2011-251549, filed on Nov. 17, 2011. The contents of the aforementioned applications are incorporated herein by reference.

BACKGROUND

Field of the Invention

The present invention relates to $CaF_2$ translucent ceramics composed mainly of calcium fluoride ($CaF_2$) and a manufacturing method of $CaF_2$ translucent ceramics.

Background

Calcium fluoride ($CaF_2$, fluorite) is a material having excellent optical characteristics such as high transmittance of light in a wide wavelength range from the ultraviolet region to the infrared region and small reflection loss due to a low refractive index. Moreover, $CaF_2$ has excellent thermal conductivity and therefore is very suitable for a laser crystal.

However, $CaF_2$ can be manufactured, actually, only as a single crystal, and there is a problem in that $CaF_2$ is very costly due to a long period of time for crystal growth, a problem in that growth of a large-size crystal is difficult, or the like.

Moreover, careful handling is required because calcium fluoride is a single crystal and easily cleaved, is easily cracked due to a sudden change in temperature, or the like.

In order to solve such problems, a manufacturing technique of manufacturing polycrystalline-body $CaF_2$ translucent ceramics by sintering $CaF_2$ powder is known (for example, refer to Japanese Patent Publication No. 4747587).

SUMMARY

An object of an aspect of the present invention is to provide $CaF_2$ translucent ceramics having high transmittance and a manufacturing method of $CaF_2$ translucent ceramics.

$CaF_2$ translucent ceramics according to an aspect of the present invention includes at least two rare earth elements selected from a group consisting of La, Pr, Nd, Sm, Eu, Tb, Dy, Ho, Er, Tm, Yb, and Lu.

In the $CaF_2$ translucent ceramics described above, the total concentration of the at least two rare earth elements can be 0.2 mol % to 5.9 mol %, and each concentration of the at least two rare earth elements can be 0.1 mol % to 5.8 mol %.

The $CaF_2$ translucent ceramics described above can include at least one rare earth element selected from a group consisting of Pr, Nd, Sm, Eu, Tb, Dy, Ho, Er, Tm, and Yb.

The $CaF_2$ translucent ceramics described above can further include phosphor particles.

In the $CaF_2$ translucent ceramics described above, the phosphor particles can be at least one selected from a group consisting of YAG: Ce, CaS: Eu, and SrS: Eu.

A method of manufacturing $CaF_2$ translucent ceramics according to another aspect of the present invention includes: mixing calcium fluoride fine particles and rare earth fluoride fine particles produced separately from the calcium fluoride fine particles to prepare a fine particles mixture; and sintering the fine particles mixture to make the fine particles mixture transparent.

In the method of manufacturing $CaF_2$ translucent ceramics described above, the fine particles mixture can be heated in the atmosphere at a temperature of 750° C. to 900° C. to be sintered.

In the method of manufacturing $CaF_2$ translucent ceramics described above, the fine particles mixture can be heated at a temperature of 750° C. to 900° C. to be primarily sintered and then can be heated at a temperature of 700° C. to 1000° C. while being pressurized at a pressure of 500 $kg/cm^2$ to 3000 $kg/cm^2$ in an inert atmosphere to be secondarily sintered.

In the method of manufacturing $CaF_2$ translucent ceramics described above, an average particle size of primary particles of the calcium fluoride fine particles can be 200 nm or less, and an average particle size of primary particles of the rare earth fluoride fine particles can be 100 nm or less.

Here, the average particle size of primary particles is defined by an average value of maximum lengths measured for each primary particle across one direction specified in the field of view, with respect to 100 or more primary particles simultaneously observed with a transmission electron microscope.

The method of manufacturing $CaF_2$ translucent ceramics described above can include a step of reacting a calcium compound and a fluorine compound in an aqueous solution and then heating in a closed vessel at a temperature of 100° C. to 200° C. to produce the calcium fluoride fine particles.

The method of manufacturing $CaF_2$ translucent ceramics described above can include a step of reacting a rare earth compound and a fluorine compound in an aqueous solution and then heating in a closed vessel at a temperature of 100° C. to 200° C. to produce the rare earth fluoride fine particles.

The method of manufacturing $CaF_2$ translucent ceramics described above can include a step of performing wet mixing of the calcium fluoride fine particles and the rare earth fluoride fine particles to prepare the fine particles mixture.

In the method of manufacturing $CaF_2$ translucent ceramics described above, the wet mixing can be performed using a mechanical mixing unit.

In the method of manufacturing $CaF_2$ translucent ceramics described above, in the wet mixing, cohesion force between primary particles in each of the calcium fluoride fine particles and the rare earth fluoride fine particles can be chemically reduced.

In the method of manufacturing $CaF_2$ translucent ceramics described above, in the wet mixing, cohesion force between primary particles in each of the calcium fluoride fine particles and the rare earth fluoride fine particles can be mechanically reduced.

In the method of manufacturing $CaF_2$ translucent ceramics described above, in the wet mixing, after cohesion force between primary particles in each of the calcium fluoride fine particles and the rare earth fluoride fine particles can be reduced, an alkali solution can be added to a suspension including the calcium fluoride fine particles and the rare earth fluoride fine particles, and then centrifugation is performed.

In the method of manufacturing $CaF_2$ translucent ceramics described above, the alkali solution can be an organic alkali solution.

According to an aspect of the present invention, it is possible to provide $CaF_2$ translucent ceramics having translucency and being capable of transmitting light.

Figure 1:
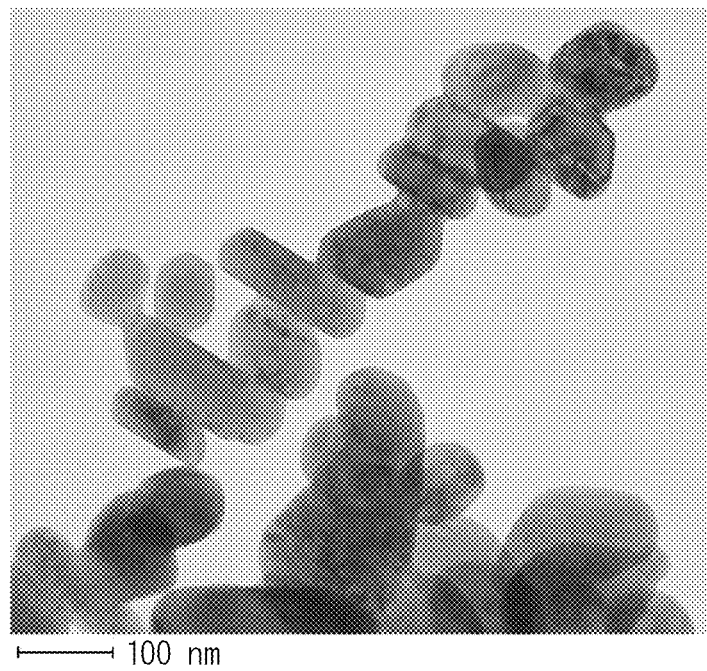
FIG. 1 is a transmission electron microscope (TEM) photograph of $YbF_3$ fine particles.

DESCRIPTION OF THE EMBODIMENTS $CaF_2$ translucent ceramics and a manufacturing method of $CaF_2$ translucent ceramics of the present embodiment will be described.

Note that, the present embodiment is specifically described for better understanding of the scope of the present invention, and the present invention is not limited thereto unless otherwise specified.

[$CaF_2$ Translucent Ceramics]

When a fluoride such as $CaF_2$ is heated to a high temperature in the atmosphere, the transparency (transmittance) decreases due to separation of fluorine and oxidization. Accordingly, the present inventor has found that by sintering $CaF_2$ while adding a pressure in an inert atmosphere such as argon or sintering $CaF_2$ in vacuum such that the sintering temperature is set to about 1000° C. or more, the obtained $CaF_2$ translucent ceramics tends to be slightly cloudy.

The $CaF_2$ translucent ceramics of the present embodiment is substantially a polycrystalline body of a Ca—R—F compound generated by solid-phase reaction of calcium fluoride ($CaF_2$) and rare earth fluoride ($RF_3$) and has translucency capable of transmitting light. The $CaF_2$ translucent ceramics of the present embodiment includes at least two selected from a group consisting of La, Pr, Nd, Sm, Eu, Tb, Dy, Ho, Er, Tm, Yb, and Lu as rare earth elements.

The $CaF_2$ translucent ceramics of the present embodiment, specifically, can include two selected from a group consisting of La, Eu, Tb, Dy, Tm, Yb, and Lu in order to obtain colorless and transparent $CaF_2$ translucent ceramics of low absorption in the visible region.

The $CaF_2$ translucent ceramics of the present embodiment can be used as a member that transmits light inside. Specifically, the $CaF_2$ translucent ceramics of the present embodiment can be used as a laser crystal or an inorganic base material in which phosphor particles are dispersed.

The $CaF_2$ translucent ceramics of the present embodiment is a polycrystalline body containing a set of compound groups collectively called as calcium rare earth fluoride.

Calcium rare earth fluoride has a composition ratio (atomic ratio) indicated by $(Ca_{1-x}R_x)F_{2+x}$. This composition ratio can be accurately measured using a fluorescent X-ray analysis or a variety of chemical analysis methods. In the calcium rare earth fluoride indicated by $(Ca_{1-x}R_x)F_{2+x}$, R represents a rare earth element, and this R is at least two selected from a group consisting of La, Pr, Nd, Sm, Eu, Tb, Dy, Ho, Er, Tm, Yb, and Lu.

X can be a number of 0.002 (0.2 mol %) to 0.059 (5.9 mol %).

Since the crystal system of calcium rare earth fluoride is cubic, it is possible to ensure consistency of a crystal structure at grain boundaries and to substantially eliminate scattering of light. Therefore, the $CaF_2$ transparent ceramics of the present embodiment is made to contain calcium rare earth fluoride and thereby has high transmittance although it is ceramics.

In the composition ratio indicated by $(Ca_{1-x}R_x)F_{2+x}$ described above, X1 (total amount of rare earth ions (total concentration of the rare earth elements)) can be 0.002 (0.2 mol %) to 0.059 (5.9 mol %) and is preferably 0.005 (0.5 mol %) to 0.04 (4.0 mol %).

When the X1 is less than 0.002 (0.2 mol %), the effect of $RF_3$ as a sintering aid may not be obtained, and it may be difficult to enhance the transmittance of the $CaF_2$ transparent ceramics. On the other hand, when the X1 exceeds 0.059 (5.9 mol %), in the case that the sintering temperature is set to 1000° C. or less, it may be difficult to completely react $CaF_2$ and $RF_3$, composition spots may occur inside the sintered body, and as a result, it may be difficult to obtain $CaF_2$ transparent ceramics having high transmittance.

In addition, in the composition ratio indicated by $(Ca_{1-x}R_x)F_{2+x}$ described above, since the R represents at least two rare earth elements, X2 (each amount of at least two rare earth elements (each concentration of at least two rare earth elements)) can be 0.001 (0.1 mol %) to 0.058 (5.8 mol %) and is preferably 0.005 (0.5 mol %) to 0.03 (3.0 mol %).

When the X2 is less than 0.001 (0.1 mol %), the effect of $RF_3$ as a sintering aid may not be obtained, and it may be difficult to enhance the transmittance of the $CaF_2$ transparent ceramics. On the other hand, when the X2 is set to be greater than 0.059 (5.9 mol %), in the case that the sintering temperature is set to 1000° C. or less, it may be difficult to completely react $CaF_2$ and $RF_3$, and as a result, it may be difficult to obtain $CaF_2$ transparent ceramics having high transmittance.

In addition, the $CaF_2$ translucent ceramics of the present embodiment can include at least one rare earth element selected from a group consisting of Pr, Nd, Sm, Eu, Tb, Dy, Ho, Er, Tm, and Yb as the rare earth element in case of being used as a phosphor base material or a laser crystal.

Moreover, the $CaF_2$ translucent ceramics of the present embodiment can include phosphor particles in case of being used as a phosphor base material.

The phosphor particles can be at least one selected from a group consisting of $Y_3Al_5O_{12}$: Ce (YAG: Ce), CaS: Eu, and SrS: Eu.

The $CaF_2$ translucent ceramics of the present embodiment has translucency capable of transmitting light. This transparency can be appropriately adjusted by adjusting the type and the content of the rare earth element corresponding to the use of the $CaF_2$ translucent ceramics. For example, in the $CaF_2$ translucent ceramics of the present embodiment, the transmittance of light having a wavelength to be transmitted at the time of use can be 50% or more. In the case that the $CaF_2$ translucent ceramics of the present embodiment is used as a phosphor base material for a white LED, since the transmittance can be 50% or more and is preferably 70% or more, the $CaF_2$ translucent ceramics may be manufactured by performing the sintering in the atmosphere.

Note that, the transmittance in the present embodiment is defined by the linear transmittance at a wavelength of 550 nm obtained by measuring a sample of which a thickness is 3 mm and of which both surfaces are optically polished is measured.

When the conventional resin sealing material such as epoxy resin or silicone as the phosphor base material for a white LED is replaced by the $CaF_2$ translucent ceramics of the present embodiment as an inorganic material, heat durability against high heat from a blue LED is significantly improved. Thereby, such effects that it is possible to improve the life of a lighting apparatus including a white LED or to implement a lighting apparatus including a white LED having an improved illuminance can be obtained. Moreover, because the $CaF_2$ translucent ceramics of the present embodiment can be manufactured by sintering a fine particles mixture of $CaF_2$ fine particles and $RF_3$ fine particles in the atmosphere at a temperature of 1000° C. or less, effects such as it being possible to reduce the manufacturing cost and it also being possible to reduce the manufacturing energy, can be obtained.

Moreover, when the $CaF_2$ translucent ceramics of the present embodiment is applied to the use such as a lens or a laser crystal which requires high transmittance of 80 to 85% or more, in addition to sintering in the atmosphere, it is possible to perform a high-temperature and high-pressure process using a hot isostatic pressing (HIP) apparatus (hereinafter, referred to as a "HIP process").

In the HIP process, for example, the $CaF_2$ translucent ceramics is sintered by heating at a temperature of 700° C. to 1000° C. while adding a pressure of 500 kg/cm² to 3000 kg/cm² in an inert atmosphere such as argon or nitrogen.

The $CaF_2$ translucent ceramics of the present embodiment may be used as it is, but can be used as an optical member having a predetermined shape. For example, it is possible to process the $CaF_2$ translucent ceramics into an optical member of which the light incident surface or the light emitting surface has a variety of shapes such as a spherical shape, an aspherical shape, a planar shape, and a lattice shape. A variety of coatings such as an antireflection film or a wavelength selective film may be applied to the surface of the optical member according to the purpose. Moreover, one and two or more of optical members formed by similar $CaF_2$ translucent ceramics can be used in combination.

In addition, it is also possible to combine an optical member formed of $CaF_2$ translucent ceramics with an optical member formed by other materials and to configure an optical system. For example, at least one optical member formed of $CaF_2$ translucent ceramics and at least one optical member formed of a material selected from optical glass, optical plastics, optical crystals, or the like can be used in combination.

The $CaF_2$ translucent ceramics of the present embodiment is novel ceramics formed of a sintered body of calcium rare earth fluoride to which good translucency is added. The $CaF_2$ translucent ceramics of the present embodiment and the optical member formed by the $CaF_2$ translucent ceramics of the present embodiment have optical properties different from the optical properties of $CaF_2$ crystals and $GdF_3$ crystals and are fluoride materials having an unprecedented refractive index and an unprecedented Abbe number. Specifically, the $CaF_2$ translucent ceramics of the present embodiment has an Abbe number as substantially high as that of fluorite and also has a slightly higher refractive index than that of fluorite.

Because the $CaF_2$ translucent ceramics of the present embodiment is a polycrystalline body, anisotropic thermal expansion strain depending on the crystal orientation is not exhibited at the time of a temperature increase, and isotropic thermal expansion strain occurs. Therefore, when the $CaF_2$ translucent ceramics of the present embodiment is processed, damage due to strain hardly occurs. In addition, when the $CaF_2$ translucent ceramics of the present embodiment is used such that light is transmitted therethrough, deterioration of the imaging performance due to temperature change hardly occurs.

It is possible to obtain translucency even by adding $RF_3$ of one type to $CaF_2$, but by adding $RF_3$ of two different types to $CaF_2$ as the present embodiment, it is possible to stabilize translucency, and also it is possible to enhance the transmittance. In the research using a single crystal of $CaF_2$, it is reported that when rare earth ions ($R^{3+}$) is added to $CaF_2$, part of the $Ca^{2+}$ sites is replaced by $R^{3+}$, and simultaneously $F^-$ is formed in order to maintain electrical neutrality. However, unlike the single crystal grown slowly over several weeks, in the case that reaction is completed in several hours as sintering, it is basically difficult to replace the divalent Ca sites by the trivalent rare earth ions. Accordingly, in the present embodiment, electrical neutrality in the crystal is maintained by adding $RF_3$ of two different types to $CaF_2$, and part of the $Ca^{2+}$ sites is stably replaced by $R^{3+}$. It is estimated that the reason why part of the $Ca^{2+}$ sites is stably replaced by $R^{3+}$ is that one $R^{3+}$ of the $R^{3+}$ of two types becomes buffer ions of the other $R^{3+}$ and both can stably exist.

[Method of Manufacturing $CaF_2$ Translucent Ceramics]

Next, a method of manufacturing $CaF_2$ translucent ceramics of the present embodiment will be described.

In order to manufacture $CaF_2$ translucent ceramics, a ceramics forming composition containing $CaF_2$ fine particles and $RF_3$ fine particles produced separately from the $CaF_2$ fine particles is prepared, the ceramics forming composition is mixed as uniformly as possible to prepare a fine particles mixture, and the fine particles mixture is sintered to be transparent. In addition, if necessary, the sintered body of the fine particles mixture is secondarily sintered (HIP process).

The ceramics forming composition is a material which can be formed into ceramics by application of an appropriate process such as heating or pressurization and includes $CaF_2$ fine particles and $RF_3$ fine particles which can be sintered. The $CaF_2$ fine particles and the $RF_3$ fine particles contained in the ceramics forming composition can be high-purity fine particles having a reduced amount of other components.

The $CaF_2$ fine particles and the $RF_3$ fine particles included in the ceramics forming composition which are separately produced are used. For example, a fine particles mixture obtained by simultaneously generating $CaF_2$ and $RF_3$ by adding a fluorine compound to a mixed solution including both a calcium compound and a lanthanum compound, or composite fine particles including both of these components is not used in the present embodiment. According to such a method, it may be difficult to obtain $CaF_2$ fine particles and $RF_3$ fine particles having excellent sinterability.

The average particle size of primary particles of the $CaF_2$ fine particles used in the ceramics forming composition can be 200 nm or less, and the primary particles are preferably fine particles having an average particle size of 150 nm or less.

The average particle size of primary particles of the $RF_3$ fine particles used in the ceramics forming composition can be 100 nm or less, and the primary particles are preferably fine particles having an average particle size of 70 nm or less.

When fine particles having an average particle size exceeding 100 nm is included in the ceramics forming composition, there is a tendency that a region having a locally different rare earth element concentration in the $CaF_2$ translucent ceramics after sintering is easily formed.

Note that, even when the material of the ceramics forming composition includes fine particles having an average particle size exceeding 200 nm, the fine particles can be finely grained in the process of preparing a fine particles mixture such that the average particle size becomes 200 nm or less.

In the $CaF_2$ fine particles and the $RF_3$ fine particles, aggregates (secondary particles) formed by aggregation of a plurality of primary particles are included. In the process of preparing a fine particles mixture, by crashing and dispersing the secondary particles, the primary particles of the $CaF_2$ fine particles and the primary particles of the $RF_3$ fine particles can be uniformly mixed. As a result, solid-phase reaction between the $CaF_2$ fine particles and the $RF_3$ fine particles by sintering progresses at a lower temperature, and $CaF_2$ translucent ceramics having high transparency can be obtained.

If a fine particles mixture in which $CaF_2$ fine particles and $RF_3$ fine particles are mixed as in the form of secondary particles is sintered, the contact area between the $CaF_2$ fine particles and the $RF_3$ fine particles tends to be small at the time of sintering. In this case, solid-state reaction between the $CaF_2$ fine particles and the $RF_3$ fine particles does not sufficiently occur.

As a result, in the finally obtained $CaF_2$ translucent ceramics, $CaF_2$ crystalline phase and $RF_3$ crystalline phase microscopically occur, and composition spots microscopically occur. Moreover, when the sintering temperature is increased in order to solve this, separation of fluorine from fluoride occurs, and this becomes the cause of decreasing transmittance.

[Production of $CaF_2$ Fine Particles]

$CaF_2$ fine particles can be produced by reacting a calcium compound and a fluorine compound in an aqueous solution and then heating the resultant in a closed vessel at a temperature of 100° C. to 200° C.

Examples of the calcium compound used to produce the $CaF_2$ fine particles include organic acid salts of calcium such as acetate, lactate, oxalate, ascorbate, alginate, benzoate, carbonate, citrate, gluconate, pantothenate, salicylate, stearate, tartrate, glycerate, and trifluoroacetate and inorganic salts of calcium such as chloride, hydroxide, nitrate, and sulfate. Among these calcium compounds, calcium acetate can be used because solubility in water is high and impurity ions such as sulfate or chloride hardly remain in the $CaF_2$ fine particles.

As the fluorine compound, hydrofluoric acid (hydrofluoric acid) or the like is used. By using hydrofluoric acid as the fluorine compound, impurity ions hardly remain in the $CaF_2$ fine particles.

The reaction between the calcium compound and the fluorine compound can be performed by preparing aqueous solutions in which each of the compounds is dissolved and gradually injecting the fluorine compound aqueous solution into the calcium compound aqueous solution at ordinary temperatures and pressures.

At the time of the reaction between the calcium compound and the fluorine compound, the amount of other ions such as rare earth ions or transition metal ions existing in the reaction mixture can be as low as possible. When Ca ions and fluorine ions coexist with other ions in the reaction mixture, since other ions are incorporated in the formed $CaF_2$ fine particles, the crystallinity of $CaF_2$ is degraded and the particles easily aggregate. Therefore, in the sintering described later, strongly aggregated particles cannot dissociate, a problem in that voids remain in the $CaF_2$ translucent ceramics and the density decreases or the like occurs, and the sinterability is easily deteriorated. In addition, in the sintering, a high-density sintered body cannot be obtained in most cases even when the sintering condition is slightly changed. Thus, because ions other than Ca ions and fluorine ions sensitively affect the sinterability and deteriorate the sinterability, the amount can be reduced to be as low as possible.

In addition, at the time of the reaction between the calcium compound and the fluorine compound, the additional amount of the fluorine compound can be an excess amount greater than the chemical equivalent (chemical equivalent when converted to $CaF_2$) to the calcium compound. Thereby, the crystallinity of the formed $CaF_2$ fine particles is improved, and the aggregation can be suppressed. As a result, $CaF_2$ fine particles having little fluorine deficiency and high crystallinity are formed.

Moreover, when the fluorine compound aqueous solution is injected in the calcium compound aqueous solution, the mixed solution of the calcium compound aqueous solution and the fluorine compound aqueous solution can be stirred, and furthermore, the stirring of the mixed solution can be continued even after completing the injection. Thereby, it is possible to suppress the aggregation of the primary particles formed of the generated $CaF_2$ crystals. In the case that the $CaF_2$ fine particles are generated in a state where the primary particles are strongly aggregated, the aggregation cannot be dissociated even by heating or pressurization at the time of sintering and making transparency, voids remain in the $CaF_2$ translucent ceramics, and it may be difficult to obtain dense ceramics. Therefore, during the time of generating the $CaF_2$ crystals, the stirring of the mixed solution can be sufficiently performed.

After the calcium compound and the fluorine compound are reacted at ordinary temperatures and pressures as described above, the reaction mixture is contained in a closed vessel, and a hydrothermal reaction process of performing a heating and pressurization process at a temperature of 100° C. to 200° C. can be performed.

Only by the reaction between the calcium compound and the fluorine compound at ordinary temperatures and pressures, the reaction does not sufficiently progress, and the crystal becomes a fluoride having much fluorine deficiency. Therefore, the stoichiometric ratio as is of the crystals in the obtained reaction mixture is "Ca:F=1:smaller than 2", the crystallinity is low, and the aggregation easily occurs.

Accordingly, after the calcium compound and the fluorine compound are reacted at ordinary temperatures and pressures, the hydrothermal reaction process of performing a heating and pressurization process at a temperature of 100°

C. to 200° C. is further performed, and the reaction between the calcium compound and the fluorine compound can be completed.

The container used for the hydrothermal reaction process is not particularly limited. For example, a closed vessel such as an autoclave made of polytetrafluoroethylene is used.

The temperature of the hydrothermal reaction process can be 120° C. to 180° C.

The pressure of the hydrothermal reaction process can be 0.2 MPa to 1.0 MPa which is the saturation vapor pressure of water in a temperature range of 120° C. to 180° C.

Thereby, in the $CaF_2$ fine particles, the ratio of F to Ca can be substantially 2, and $CaF_2$ fine particles having high crystallinity can be formed. Therefore, the surface of the $CaF_2$ fine particles becomes stable, and the cohesion force between fine particles can be reduced. As a result, it is possible to obtain $CaF_2$ fine particles of excellent sinterability, which are easy to be densely sintered even at a relatively low temperature.

Note that, according to the producing method described above, for example, $CaF_2$ fine particles of which the average particle size of the primary particles is 100 nm to 200 nm can be obtained.

[Production of $RF_3$ Fine Particles]

$RF_3$ fine particles can be produced, substantially similarly to the production of $CaF_2$ fine particles, by reacting a rare earth compound and a fluorine compound in an aqueous solution and then heating in a closed vessel at a temperature of 100° C. to 200° C.

Examples of the rare earth compound used to produce the $RF_3$ fine particles include organic acid salts of rare earth element such as acetate, lactate, oxalate, ascorbate, alginate, benzoate, carbonate, citrate, gluconate, pantothenate, salicylate, stearate, tartrate, glycerate, and trifluoroacetate and inorganic salts of rare earth element such as chloride, hydroxide, nitrate, and sulfate. Among these rare earth compounds, acetate can be used.

As the fluorine compound, hydrofluoric acid (hydrofluoric acid) or the like is used. By using hydrofluoric acid as the fluorine compound, impurity ions hardly remain in the $RF_3$ fine particles.

The reaction between the rare earth compound and the fluorine compound can be performed by preparing aqueous solutions in which each of the compounds is dissolved and gradually injecting the fluorine compound aqueous solution into the rare earth compound aqueous solution at ordinary temperatures and pressures.

Here, in order to sufficiently dissolve the rare earth compound, an inorganic acid such as nitric acid of a slight amount may be added.

At the time of the reaction between the rare earth compound and the fluorine compound, the amount of other ions such as Ca ions existing in the reaction mixture can be as low as possible. Thereby, it is possible to suppress the degradation of crystallinity of the formed $RF_3$ fine particles and to improve the sinterability.

In addition, at the time of the reaction between the rare earth compound and the fluorine compound, the injection amount of the fluorine compound aqueous solution can be an excess amount greater than the chemical equivalent (chemical equivalent when converted to $RF_3$) to the rare earth compound aqueous solution (for example, ytterbium acetate aqueous solution). Thereby, it is possible to suppress the degradation of crystallinity of the formed $RF_3$ fine particles and to weaken the cohesion force between fine particles.

Moreover, when the fluorine compound aqueous solution is injected in the rare earth compound aqueous solution and thereafter, by stirring the mixed solution of the rare earth compound aqueous solution and the fluorine compound aqueous solution, it is possible to suppress the aggregation of the primary particles formed of the generated $RF_3$ crystals.

After the rare earth compound and the fluorine compound are reacted at ordinary temperatures and pressures, the hydrothermal reaction process of performing a heating and pressurization process is further performed at a temperature of 100° C. to 200° C., or preferably 120° C. to 180° C., and the reaction between the rare earth compound and the fluorine compound is completed.

Thereby, it is possible to suppress fluorine deficiency and improve the crystallinity of the $RF_3$ fine particles. Therefore, the particles can be hardly aggregated, and it is possible to form $RF_3$ fine particles to be densely sintered even at a relatively low temperature.

Note that, according to the producing method described above, for example, $RF_3$ fine particles of which the average particle size of the primary particles is 50 nm to 100 nm can be obtained.

The reaction mixture containing $CaF_2$ fine particles and the reaction mixture containing $RF_3$ fine particles obtained in such a way are both suspensions in which fine particles of crystals are dispersed in a strongly acidic aqueous solution. Therefore, the reaction mixtures are separated by solid-liquid separation using a centrifuge or the like and are dried at a temperature of room temperature to 200° C., and thereby a dry power is obtained. Thus, the strongly acidic aqueous solution is separated by solid-liquid separation and drying, and thereby handling becomes easy at the time of a subsequent process or storage. Moreover, mixing of impurities into the liquid phase can also be suppressed. In addition, in the case that both $CaF_2$ fine particles and $RF_3$ fine particles are mixed at a constant rate, it is possible to accurately weigh the particles when the particles are in powder form, and therefore optical properties such as the refractive index become stable.

[Preparation of Ceramics Forming Composition]

A ceramics forming composition can be prepared by mixing $CaF_2$ fine particles and $RF_3$ fine particles in dry powder form. The ceramics forming composition is a material capable of forming translucent ceramics by being sintered and being made transparent. The ceramics forming composition may include $CaF_2$ fine particles and $RF_3$ fine particles accurately at a predetermined mass ratio, or the particles may be uniformly mixed. Moreover, the ceramics forming composition may be in powder form or may be dispersed or suspended in a dispersion liquid as a slurry or the like.

In order to prepare the ceramics forming composition, after preparing powder of the $CaF_2$ fine particles and the $RF_3$ fine particles, the powder is weighed accurately at a predetermined mass ratio and is put into a container.

Next, distilled water is added in the container, and a suspension including the $CaF_2$ fine particles and the $RF_3$ fine particles is prepared.

Then, the suspension is mixed by wet mixing using a wet dispersion apparatus. Thereby, the aggregated particles of the $CaF_2$ fine particles and the $RF_3$ fine particles are crushed and separated into primary particles, and a state in which both particles are uniformly mixed is obtained. In the case of mixing by wet mixing, it is possible to mix the particles more uniformly than dry mixing, and also it is possible to hardly give damage by excessive stress to the primary particles of the $CaF_2$ fine particles and the $RF_3$ fine particles.

Examples of effective methods of dissociating the aggregated state of the secondary particles include cohesion force reduction by a chemical process and aggregated particles disaggregation by a mechanical process.

In the cohesion force reduction by a chemical process, when a slurry of the $CaF_2$ fine particles and the $RF_3$ fine particles passing through a hydrothermal process is dried, distilled water as the dispersion liquid is replaced by a higher alcohol such as propanol, and the $CaF_2$ fine particles and the $RF_3$ fine particles are washed by the higher alcohol and then dried. Thereby, the cohesion force can be weakened, and subsequent aggregated particles disaggregation by a mechanical process is facilitated.

In the aggregated particles disaggregation by a mechanical process, the disaggregation can be performed by stirring using a stirring blade or the like, or using a dispersion apparatus such as a bead mill, a high-pressure homogenizer, a high-speed turning machine, and an ultrasonic disperser.

In the case of the aggregated particles disaggregation by a mechanical process, when excessive stress is given, because stress remains in the primary particles, or the primary particles are damaged, the $CaF_2$ translucent ceramics cracks at the stage of sintering, or warpage easily occurs. In addition, in the case that a media type apparatus such as a bead mill is used, a problem of contamination due to beads or the wear of the apparatus may arise. Accordingly, as the beads, beads of silicon nitride or silicon carbide than partially stabilized zirconia which is generally used can be used. Preferably, the aggregated particles disaggregation can be performed without using a dispersion media such as beads, namely by using a high-pressure homogenizer which is a media-less type apparatus.

Then, the fine particles mixture obtained by mixing the $CaF_2$ fine particles and the $RF_3$ fine particles uniformly in the dispersion liquid is separated by solid-liquid separation using a centrifuge.

Here, if the aggregated particles are disaggregated and separated into the primary particles, the solid-liquid separation by centrifugation may be difficult. Therefore, by adding an alkali solution to the suspension including the $CaF_2$ fine particles and the $RF_3$ fine particles such that the pH of the suspension becomes alkaline, the primary particles reaggregate, and the centrifugation can easily be performed.

As the alkali solution, an inorganic alkali solution such as sodium hydroxide and potassium hydroxide, an organic alkali solution such as tetramethylammonium hydroxide (TMAH) and 2-hydroxyethyl-trimethylammonium hydroxide, or the like is used.

When an organic alkali solution is used, a problem that impurities such as sodium and potassium are mixed in the dispersion liquid as in the case of an inorganic alkali solution does not arise. In addition, the organic alkali solution is easily dissolved and separated by heating and therefore hardly remains in the $CaF_2$ translucent ceramics. When the pH of the suspension is set to 7 or more, namely alkaline, centrifugal precipitation of the $CaF_2$ fine particles and the $RF_3$ fine particles occurs. When the pH of the suspension is set to a range of 12 to 13.5, it is possible to obtain a uniform sintered body.

Because the reaggregation of this case is a phenomenon occurring after the primary particles of the $CaF_2$ fine particles and the primary particles of the $RF_3$ fine particles are uniformly mixed, the composition uniformity of the powder as a whole is maintained. Therefore, by centrifuging, discarding the supernatant solution, and then drying at 100° C., dry powder including the $CaF_2$ fine particles and the $RF_3$ fine particles at a predetermined mass ratio can be obtained.

Alternatively, without using a centrifuge, by directly drying using a freeze-drying method, a spray-drying method, or the like, dry powder including the $CaF_2$ fine particles and the $RF_3$ fine particles at a predetermined mass ratio can be obtained.

By the aggregation dissociation described above, 80% or more (number ratio), or preferably 95% or more of each of the $CaF_2$ fine particles and the $RF_3$ fine particles can be primary particles.

In this way, when wet mixing is performed while dissociating and disaggregating the aggregation of the $CaF_2$ fine particles and the $RF_3$ fine particles and thereby separating the aggregated particles substantially into primary particles, the primary particles of each compound can be mixed more uniformly. Thereby, it is possible to reduce internal composition spots in the $CaF_2$ translucent ceramics after sintering and to obtain $CaF_2$ translucent ceramics having excellent internal homogeneity.

As described above, by performing wet mixing, it is possible to prepare a fine particles mixture in a state where the primary particles of the $CaF_2$ fine particles and the primary particles of the $RF_3$ fine particles are mixed as uniformly as possible. From a microscopic point of view, there is also an advantage that the solid-phase reaction between the $CaF_2$ fine particles and the $RF_3$ fine particles progresses at a lower temperature in the case that the primary particles of the $CaF_2$ fine particles and the primary particles of the $RF_3$ fine particles closely exist in the fine particles mixture due to wet mixing. As a result, it is possible to suppress fluorine deficiency occurring at the time of sintering and to improve the transmittance.

[Molding and Sintering of Fine Particles Mixture]

Next, by pressurizing the dry powder of the fine particles mixture obtained in the manner described above using a metal mold uniaxial press apparatus or the like, a compact is produced.

Moreover, when isostatic press is used, it is possible to prevent lamination (phenomenon of exfoliation in layers in the direction perpendicular to the press direction) which frequently occurs in a metal mold uniaxial press, and the isostatic press is advantageous to produce a large-size compact.

This compact can be heated and sintered in the atmosphere at a temperature of 750° C. to 900° C. and is preferably heated and sintered at a temperature of 800° C. to 900° C.

At this time, because the aggregation of the primary particles of the $CaF_2$ fine particles and the $RF_3$ fine particles is disaggregated, and also the crystallinity of the $CaF_2$ fine particles and the $RF_3$ fine particles is high, it is possible to sinter the particles densely and to obtain a sintered body having a high relative density.

It may be difficult to obtain a dense sintered body when the sintering temperature is 750° C. or less. On the other hand, when the sintering temperature exceeds 900° C., a phenomenon in which fluorine is desorbed from the $CaF_2$ crystal and the $RF_3$ crystal becomes dominant, and it may be difficult to obtain $CaF_2$ translucent ceramics having high transparency.

Moreover, if necessary, secondary sintering by the HIP process is performed.

At the stage of sintering (primary sintering) the compact described above in the atmosphere, the sintered body becomes translucent and therefore has fewer residual pores. Therefore, the temperature in the HIP process also may be relatively low, can be 700° C. to 1000° C., and is preferably 800° C. to 950° C. In addition, the HIP process is performed in an inert atmosphere such as argon or nitrogen. The pressure by the inert atmosphere can be 500 kg/cm$^2$ to 3000 kg/cm$^2$ and is preferably 1000 kg/cm$^2$ to 2000 kg/cm$^2$. The sintered body obtained by this HIP process is sufficiently transparent. In other words, the residual pours inside the sintered body obtained by the primary sintering is pushed outside during heating and pressurization in the HIP process, and the sintered body becomes transparent. Thereby, a transparent sintered body which is further densified and has a higher relative density than that at the time of the primary sintering can be obtained. Thus, the manufacturing of CaF$_2$ translucent ceramics is completed.

In the method of manufacturing CaF$_2$ translucent ceramics of the present embodiment, CaF$_2$ fine particles and RF$_3$ fine particles produced separately from the CaF$_2$ fine particles are mixed to be a fine particles mixture, and this fine particles mixture is sintered and is made to be transparent. According to such a method of manufacturing CaF$_2$ translucent ceramics, it is easy to ensure the sinterability of the fine particles mixture. Accordingly, it is possible to obtain translucent ceramics at a significantly lower sintering temperature compared to oxide ceramics, the translucency of which can be obtained by sintering at a high temperature of generally 1400° C. to 1600° C.

[Optical Apparatus]

Figure 11:
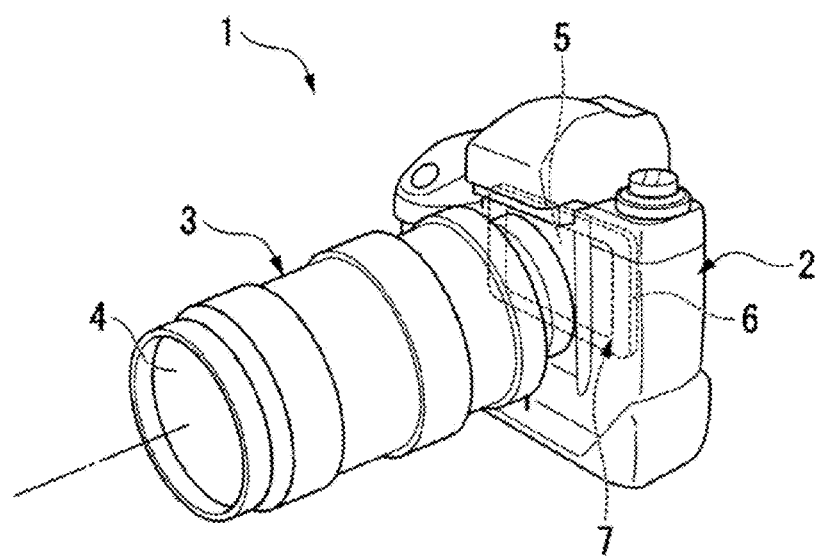
FIG. 11 is a drawing showing an imaging apparatus according to the present embodiment.

FIG. 11 shows an imaging apparatus 1 (optical apparatus) including a lens 4 (optical element) of which the base material is CaF$_2$ translucent ceramics according to the present embodiment.

This imaging apparatus 1 is a camera with interchangeable lenses. In this imaging apparatus 1, a lens barrel 3 is detachably attached to a lens mount (not shown in the drawing) of a camera body 2. Light passing through the lens 4 of this lens barrel 3 is imaged onto a sensor chip (solid-state imaging device) 5 of a multichip module 7 disposed at the backside of the camera body 2. This sensor chip 5 is a so-called bare chip such as a CMOS image sensor.

The multichip module 7 is, for example, a module of a COG (Chip On Glass) type in which the sensor chip 5 is bare-chip mounted on a glass substrate 6.

The imaging apparatus including an optical element of the present embodiment is not limited to the camera with interchangeable lenses and includes a variety of optical apparatuses including an imaging unit such as a compact camera, an industrial camera, and a smartphone camera module. In addition, examples of the optical apparatus including an optical element of the present embodiment are not limited to the imaging apparatus and include a projector, a camera interchangeable lens, a microscope, a variety of laser apparatuses, and the like. Examples of the optical element are not limited to the lens and include a prism.

EXAMPLE

Hereinafter, the present embodiment is described more specifically using experimental examples; however, the present embodiment is not limited to the following experimental examples.

[Production of CaF$_2$ Fine Particles]

640 g of distilled water and 100 ml of nitric acid were added to 180.4 g (1 mol) of calcium acetate hydrate, the calcium acetate hydrate was completely dissolved, and a calcium acetate aqueous solution was prepared.

163.8 g (4 mol) of hydrofluoric acid (hydrofluoric acid) having a concentration of 50% was added to with distilled water of the same mass, and a hydrofluoric acid aqueous solution was prepared.

The hydrofluoric acid aqueous solution was slowly injected into the calcium acetate aqueous solution while rotating a stirrer with blades (blade size: 10 cm) at 300 rpm and stirring the calcium acetate aqueous solution. At this time, an inlet of the hydrofluoric acid aqueous solution was attached to the side surface of a plastic beaker (diameter: 13 cm) to contain the calcium acetate aqueous solution, and the hydrofluoric acid aqueous solution sucked by a roller tube pump was injected over about 1 hour into the calcium acetate aqueous solution.

After the injection of the hydrofluoric acid aqueous solution was completed, stifling was continued without change for 6 hours while disaggregating the aggregated particles such that the particle size was reduced, and a CaF$_2$ slurry was prepared.

The obtained CaF$_2$ slurry was put into an autoclave made of polytetrafluoroethylene and was sealed, and hydrothermal reaction was performed by heating and pressurization at a temperature of 145° C. for 24 hours. Thus, a slurry in which CaF$_2$ fine particles were suspended was obtained.

This slurry was centrifuged by a centrifuge such that the fine particles were precipitated, and the supernatant solution was discarded. Then, the particles were dispersed again by adding isopropyl alcohol. The centrifugation was performed again by the centrifuge, and the supernatant solution was discarded. After this operation was repeated once again, the precipitated fine particles were dried at a temperature of 100° C. and dry powder of the CaF$_2$ fine particles was obtained. In this way, by repeating the alcohol replacement and the centrifugation, the CaF$_2$ fine particles were sufficiently washed with isopropyl alcohol and the cohesion force between the primary particles occurring at the time of being dried was weakened as much as possible.

[Production of RF$_3$ Fine Particles]

YbF$_3$ as an example of RF$_3$ fine particles was produced by a method substantially similar to the CaF$_2$ fine particles.

50 g (0.17 mol) of ytterbium acetate hydrate was added to with 1000 g of distilled water and was further added to with 15 ml of nitric acid. Thus, the ytterbium acetate hydrate was completely dissolved, and an ytterbium acetate aqueous solution was prepared.

183.8 g (5 mol) of hydrofluoric acid (hydrofluoric acid) having a concentration of 50% was added to with distilled water of the same mass, and a hydrofluoric acid aqueous solution was prepared.

Similarly to the production of the CaF$_2$ fine particles, the hydrofluoric acid aqueous solution was slowly injected into the ytterbium acetate aqueous solution while stirring the ytterbium acetate aqueous solution. After the injection of the hydrofluoric acid aqueous solution was completed, the stirring was continued without change while disaggregating the aggregated particles such that the particle size was reduced, and a YbF$_3$ slurry was prepared.

Moreover, a hydrothermal reaction process was applied to the obtained YbF$_3$ slurry similarly to the CaF$_2$ slurry, and a slurry in which YbF$_3$ fine particles were suspended was obtained.

This slurry was centrifuged by a centrifuge such that the particles were precipitated similarly to the production of the CaF$_2$ fine particles, and the centrifugally precipitated particles were dried at a temperature of 100° C. Thus, dry powder of the YbF$_3$ fine particles was obtained.

FIG. 1 shows a transmission electron microscope (TEM) photograph of the obtained YbF$_3$ fine particles.

From FIG. 1, the primary particle size of the YbF$_3$ fine particles was about 70 nm. In addition, when the YbF$_3$ fine particles were observed at a high magnification using a TEM, since lattice image was seen in the particles, it was confirmed that the $YbF_3$ fine particles were sufficiently crystallized. In addition, when the $YbF_3$ fine particles were observed at a low magnification using a TEM, the $YbF_3$ fine particles formed secondary particles formed by aggregation of a number of primary particles, and the maximum secondary particle size was about 10 μm.

In a manner similar to $YbF_3$, rare earth fluorides including La, Pr, Nd, Sm, Eu, Gd, Tb, Dy, Ho, Er, Tm, and Lu were also produced.

[Wet Mixing]

A slurry in which a small amount of $RF_3$ fine particles were suspended was added to a slurry in which $CaF_2$ fine particles were suspended, and a ceramics forming composition was prepared.

In the case of adding $RF_3$ fine particles of one type, $CaF_2$ fine particles and the $RF_3$ fine particles of one type were weighed such that the total amount was 100 mol % and were mixed to obtain the slurry described above. Similarly, in the case of adding $RF_3$ fine particles of two types, $CaF_2$ fine particles and the $RF_3$ fine particles of two types were weighed such that the total amount was 100 mol % and were mixed to obtain the slurry described above.

Distilled water was added to the ceramics forming composition such that the mass ratio of the mixed powder of the $CaF_2$ fine particles and the $RF_3$ fine particles was 20%, dispersion was performed by adding a pressure of 200 MPa using a commercially-available wet dispersion apparatus (Nanomizer (registered trademark), NM2-L200, manufactured by Yoshida Kikai Co., Ltd.), the aggregated particles of the $CaF_2$ fine particles and the $RF_3$ fine particles were disaggregated, and a suspension including the $CaF_2$ fine particles and the $RF_3$ fine particles was obtained.

Then, this suspension was left to stand but was not precipitated, and therefore it was possible to realize a state in which the $CaF_2$ fine particles and the $RF_3$ fine particles were uniformly dispersed in the suspension.

By adding a 15% tetramethylammonium hydroxide (TMAH) aqueous solution to this suspension such that the pH becomes 13, the $CaF_2$ fine particles and the $RF_3$ fine particles were reaggregated.

Then, the $CaF_2$ fine particles and the $RF_3$ fine particles were precipitated by centrifugation, and the precipitated fine particles were dried at 100° C. Thus, dry powder of a fine particles mixture of the $CaF_2$ fine particles and the $RF_3$ fine particles was obtained.

[Molding and Sintering of Fine Particles Mixture]

By uniaxial press molding of 3 g dry powder of the fine particles mixture using a metal mold having a diameter of 20 mm, a compact (primary compact) was formed. Furthermore, isostatic press was applied to the compact at 100 MPa to produce a compact (secondary compact).

This compact was primarily sintered by being held at 800° C. for 1 hour in the atmosphere.

Moreover, in the case that this sintered body was secondarily sintered using a HIP process, this sintered body was heated at temperatures of 800 to 950° C. for 2 hours in a high-pressure argon atmosphere of 1000 kg/cm$^2$ using a hot isostatic press (HIP) apparatus ($O_2$-Dr. HIP (registered trademark), manufactured by Kobe Steel, Ltd.).

[Composition]

As shown in Table 1 and Table 2, a fine particles mixture obtained by adding one component of $RF_3$ fine particles to $CaF_2$ fine particles (Experimental Examples 1 to 15) or a fine particles mixture obtained by adding two components of $RF_3$ fine particles to $CaF_2$ fine particles (Experimental Examples 16 to 46) was prepared (amount added: mol %).

These compacts of the fine particles mixture were all sintered at 800° C. for 1 hour in the atmosphere, and the HIP process was further applied to some of the compacts. Thus, $CaF_2$ translucent ceramics having a disk shape were obtained.

Both sides of the obtained disk-shaped translucent ceramics were polished such that the thickness becomes 3 mm, and the transmittance at a wavelength of 550 nm was measured. In addition, the color of fluorescence emitting at the time of being irradiated with ultraviolet light having a wavelength of 356 nm was observed. Table 1 and Table 2 show these results.

TABLE 1

| EXPERIMENTAL EXAMPLE | $RF_3$-1 | $RF_3$-2 | SINTER IN THE ATMOSPHERE (° C.) | HIP PROCESS (° C.) | APPEARANCE | FLUORESCENCE EMISSION (365 nm IRRADIATION) | TRANSMITTANCE (%) |
|---|---|---|---|---|---|---|---|
| 1 | 1% $PrF_3$ | — | 800 | — | CLOUDY | NONE | 65.2 |
| 2 | 1% $NdF_3$ | — | 800 | — | CLOUDY | NONE | 69.2 |
| 3 | 3% $SmF_3$ | — | 800 | — | CLOUDY | ORANGE | 57.7 |
| 4 | 1% $EuF_3$ | — | 800 | — | CLOUDY | ORANGE | 64.2 |
| 5 | 1% $TbF_3$ | — | 800 | — | CLOUDY | GREEN | 66.6 |
| 6 | 3% $DyF_3$ | — | 800 | — | CLOUDY | WEAK RED VIOLET | 67.5 |
| 7 | 3% $HoF_3$ | — | 800 | — | CLOUDY | WEAK RED VIOLET | 64.5 |
| 8 | 3% $ErF_3$ | — | 800 | — | CLOUDY | GREEN | 67.6 |
| 9 | 1% $YbF_3$ | — | 800 | — | CLOUDY | NONE | 76.7 |
| 10 | 1% $LuF_3$ | — | 800 | — | CLOUDY | NONE | 69.2 |
| 11 | 1% $LaF_3$ | — | 800 | — | CLOUDY | NONE | 60.0 |
| 12 | 1% $GdF_3$ | — | 800 | — | CLOUDY | NONE | 49.6 |
| 13 | 1% $TmF_3$ | — | 800 | — | CLOUDY | BLUE | 56.7 |
| 14 | 0.5% $TmF_3$ | — | 800 | 850 | CLOUDY | BLUE | 61.0 |
| 15 | 1% $TmF_3$ | — | 800 | 950 | SLIGHTLY CLOUD | BLUE | 80.4 |
| 16 | 1% $LaF_3$ | 0.5% $YbF_3$ | 800 | — | TRANSPARENT | NONE | 80.5 |
| 17 | 1% $LaF_3$ | 0.5% $YbF_3$ | 800 | 800 | TRANSPARENT | NONE | 91.9 |
| 18 | 1% $LaF_3$ | 1% $YbF_3$ | 800 | — | TRANSPARENT | NONE | 84.1 |
| 19 | 1% $LaF_3$ | 1% $YbF_3$ | 800 | 850 | TRANSPARENT | NONE | 91.8 |
| 20 | 1% $LaF_3$ | 3% $YbF_3$ | 800 | 900 | TRANSPARENT | NONE | 88.1 |
| 21 | 1% $LaF_3$ | 5% $YbF_3$ | 800 | — | SLIGHTLY CLOUDY | NONE | 65.0 |

TABLE 1-continued

| EXPERI-MENTAL EXAMPLE | $RF_3$-1 | $RF_3$-2 | SINTER IN THE ATMO-SPHERE (° C.) | HIP PROCESS (° C.) | APPEARANCE | FLUORESCENCE EMISSION (365 nm IRRADIATION) | TRANS-MITTANCE (%) |
|---|---|---|---|---|---|---|---|
| 22 | 1% $LaF_3$ | 5% $YbF_3$ | 800 | 950 | TRANSPARENT | NONE | 90.2 |
| 23 | 3% $LaF_3$ | 1% $YbF_3$ | 800 | 950 | TRANSPARENT | NONE | 90.4 |
| 24 | 5% $LaF_3$ | 1% $YbF_3$ | 800 | 950 | TRANSPARENT | NONE | 88.4 |

TABLE 2

| EXPERI-MENTAL EXAMPLE | $RF_3$-1 | $RF_3$-2 | SINTER IN THE ATMO-SPHERE (° C.) | HIP PROCESS (° C.) | APPEARANCE | FLUORESCENCE EMISSION (365 nm IRRADIATION) | TRANS-MITTANCE (%) |
|---|---|---|---|---|---|---|---|
| 25 | 1% $LaF_3$ | 1% $NdF_3$ | 800 | — | TRANSPARENT | NONE | 84.1 |
| 26 | 1% $LaF_3$ | 1% $NdF_3$ | 800 | 850 | TRANSPARENT | NONE | 92.3 |
| 27 | 1% $GdF_3$ | 1% $NdF_3$ | 800 | 800 | SLIGHTLY CLOUDY | NONE | 81.7 |
| 28 | 1% $LaF_3$ | 0.5% $NdF_3$ | 800 | 950 | TRANSPARENT | NONE | 87.9 |
| 29 | 1% $LaF_3$ | 0.5% $TmF_3$ | 800 | — | TRANSPARENT | BLUE | 88.5 |
| 30 | 1% $LaF_3$ | 0.5% $TmF_3$ | 800 | 800 | TRANSPARENT | BLUE | 92.3 |
| 31 | 1% $LaF_3$ | 1% $GdF_3$ | 800 | — | SLIGHTLY CLOUDY | NONE | 79.8 |
| 32 | 1% $LaF_3$ | 1% $GdF_3$ | 800 | 850 | TRANSPARENT | NONE | 82.6 |
| 33 | 1% $LaF_3$ | 1% $HoF_3$ | 800 | 800 | TRANSPARENT | GREEN | 85.5 |
| 34 | 1% $LaF_3$ | 1% $LuF_3$ | 800 | 950 | TRANSPARENT | NONE | 86.6 |
| 35 | 1% $LaF_3$ | 1% $DyF_3$ | 800 | 950 | TRANSPARENT | WHITE | 88.2 |
| 36 | 1% $LaF_3$ | 1% $ErF_3$ | 800 | 950 | TRANSPARENT | GREEN | 86.5 |
| 37 | 1% $LaF_3$ | 1% $SmF_3$ | 800 | 850 | TRANSPARENT | ORANGE | 85.6 |
| 38 | 1% $LaF_3$ | 1% $TbF_3$ | 800 | 850 | TRANSPARENT | GREEN | 88.9 |
| 39 | 1% $LaF_3$ | 1% $PrF_3$ | 800 | 850 | TRANSPARENT | NONE | 84.3 |
| 40 | 1% $LaF_3$ | 1% $EuF_3$ | 800 | 950 | TRANSPARENT | ORANGE | 88.3 |
| 41 | 1% $YbF_3$ | 1% $EuF_3$ | 800 | 850 | TRANSPARENT | ORANGE | 87.8 |
| 42 | 1% $YbF_3$ | 1% $TbF_3$ | 800 | 850 | TRANSPARENT | GREEN | 88.5 |
| 43 | 1% $YbF_3$ | 1% $DyF_3$ | 800 | 850 | TRANSPARENT | WHITE | 88.2 |
| 44 | 1% $EuF_3$ | 1% $TbF_3$ | 800 | 850 | TRANSPARENT | ORANGE | 85.2 |
| 45 | 1% $EuF_3$ | 1% $DyF_3$ | 800 | 850 | TRANSPARENT | ORANGE | 86.8 |
| 46 | 1% $EuF_3$ | 1% $TmF_3$ | 800 | 850 | TRANSPARENT | ORANGE | 87.4 |

[Transmittance]

From the results of Table 1 and Table 2, in the case of without the HIP process, in Experimental Examples 1 to 13 in which one type of $RF_3$ fine particles was added, the $CaF_2$ translucent ceramics were all cloudy. On the other hand, without the HIP process, in Experimental Examples 16, 18, 21, 25, 29, and 31 in which two types of $RF_3$ fine particles were added, the $CaF_2$ translucent ceramics were all transparent except that the $CaF_2$ translucent ceramics was slightly cloudy in Experimental Example 21 in which 5% high-concentration $YbF_3$ was added and in Experimental Example 31 in which 1% $GdF_3$ was added. In other words, it was confirmed that it was possible to make the $CaF_2$ translucent ceramics to be substantially transparent only by sintering at 800° C. in the atmosphere when two types of $RF_3$ fine particles were added. On the other hand, when only one type of $RF_3$ fine particles was added, the $CaF_2$ translucent ceramics did not become transparent only by sintering at 800° C. in the atmosphere, and it was difficult to make the $CaF_2$ translucent ceramics to be transparent even by performing the HIP process as Experimental Examples 14 and 15.

Figure 2:
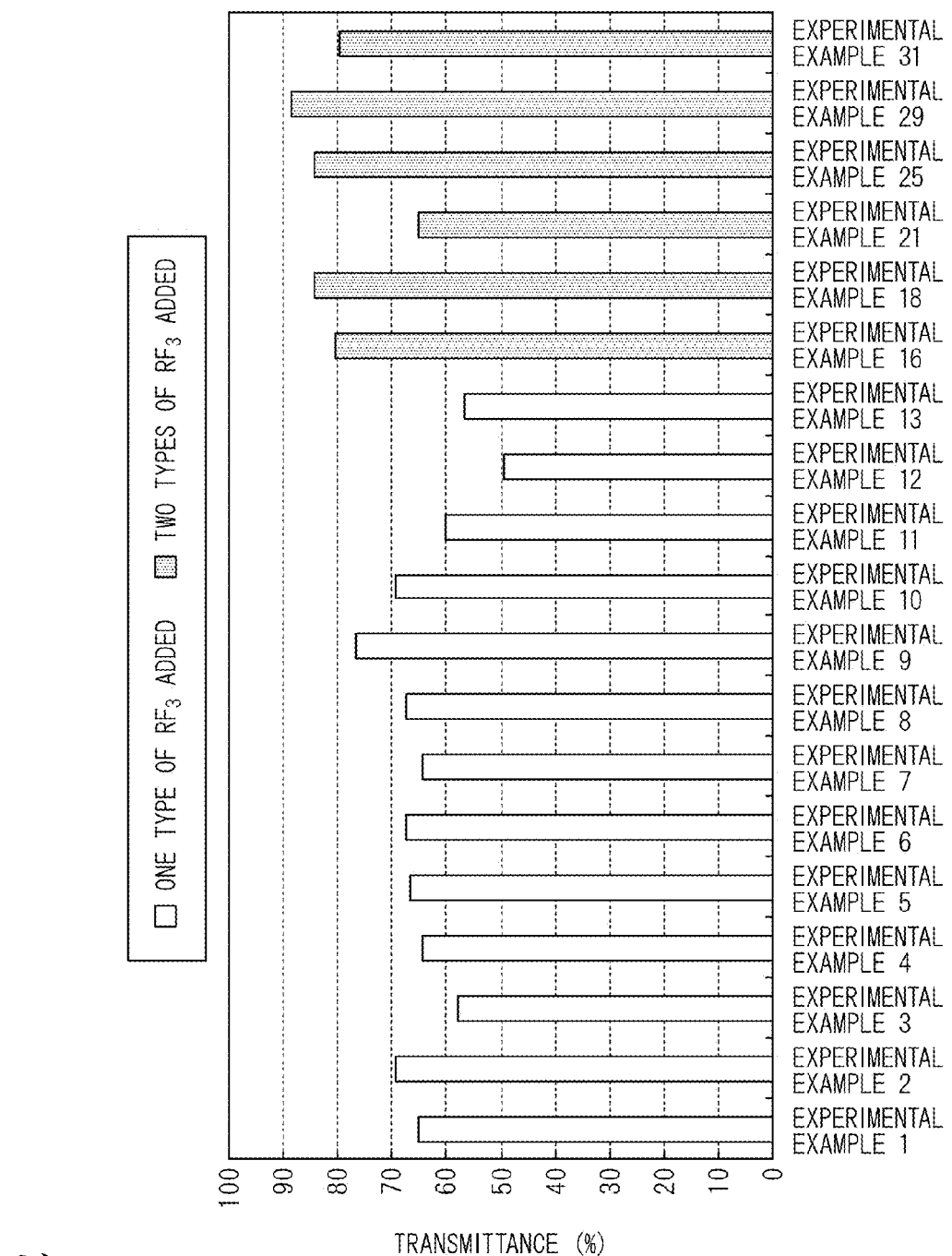
FIG. 2 is a graph showing the transmittance of $CaF_2$ translucent ceramics obtained in Experimental Examples 1 to 13, 16, 18, 21, 25, 29, and 31.

In addition, as shown in FIG. 2, the transmittance was compared with respect to Experimental Examples 1 to 13, 16, 18, 21, 25, 29, and 31 without the HIP process. The average transmittance was 64.2% in Experimental Examples 1 to 13 in which one type of $RF_3$ fine particles was added. On the other hand, in Experimental Examples 16, 18, 21, 25, 29, and 31 in which two types of $RF_3$ fine particles were added, the average transmittance was 80.3%, and the transmittance became higher than that when one type of $RF_3$ fine particles was added.

Accordingly, from the comparison of the appearance and the transmittance, it was clarified that the transparency of the $CaF_2$ translucent ceramics was improved when two types of $RF_3$ fine particles were added than when one type of $RF_3$ fine particles was added.

Moreover, by performing the HIP process, it was possible to make the transmittance to be 90% or more in Experimental Examples 17, 19, 22, 23, 26, and 30. Since the theoretical limit of the transmittance of $CaF_2$ was about 93%, it was found that the $CaF_2$ translucent ceramics of Experimental Examples 17, 19, 22, 23, 26, and 30 had few residual pores and were extremely densely sintered.

Furthermore, in Experimental Examples 17, 19, 20, 22 to 24, 26 to 28, 30, and 32 to 46 in which two types of $RF_3$ were added, it was possible to lower the sintering temperature (HIP process temperature) to 950° C. or less, and it was possible to suppress the occurrence of cloudiness of the $CaF_2$ translucent ceramics due to the volatilization of fluorine.

From the results described above, it was possible to conclude that the $CaF_2$ translucent ceramics obtained in Experimental Examples 17, 19, 20, 22 to 24, 30, 32, 34, 35, 38, and 40 to 46 were colorless and transparent ceramics capable of being used as a lens.

[Fluorescence Emission]

From the results of Table 1 and Table 2, the $CaF_2$ translucent ceramics emitting fluorescence in the visible region were those of Experimental Examples 3 to 8, 13 to 15, 29, 30, 33, 35 to 38, and 40 to 46 including any of Sm, Eu, Tb, Dy, Ho, Er, and Tm, and it was possible to recognize the color by the naked eye.

On the other hand, the $CaF_2$ translucent ceramics of Experimental Examples 1, 2, 9 to 12, 16 to 28, 31, 32, and 34 including only any of La, Pr, Nd, Yb, Gd, and Lu did not emit fluorescence or emitted fluorescence in the near infrared region, and therefore it was impossible to recognize the color by the naked eye.

In addition, only Dy was included as the rare earth element in Experimental Example 6, and only Ho was included as the rare earth element in Experimental Example 7. The $CaF_2$ translucent ceramics of Experimental Examples 6 and 7 showed only very weak emission. On the other hand, in the $CaF_2$ translucent ceramics of Experimental Examples 33, 35, and 43 including La or Yb as the rare earth element in addition to Dy or Ho, the emission intensity was higher.

From the results described above, it was found that, when two types of $RF_3$ fine particles were added, not only the transparency of the $CaF_2$ translucent ceramics was enhanced, but because the $R^{3+}$ was capable of stably existing in the crystal, the emission intensity of fluorescence was also enhanced.

[Mechanical Strength]

Figure 3:
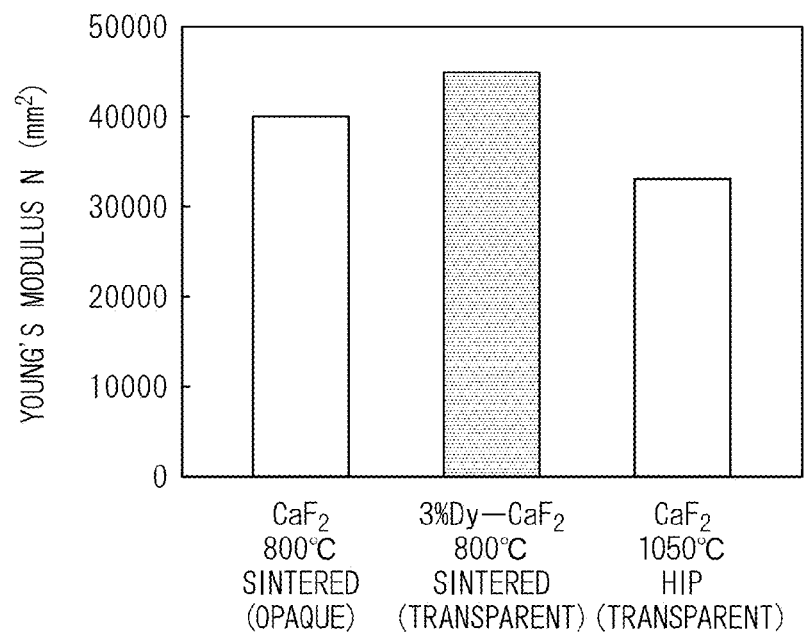
FIG. 3 is a graph showing a result of a three-point bending test of $CaF_2$ ceramics.

FIG. 3 shows a result of a three-point bending test of the $CaF_2$ ceramics including 3% $DyF_3$ obtained in Experimental Example 6, a sintered body obtained by sintering $CaF_2$ including no rare earth element (without additives) at 800° C. in the atmosphere, and a sintered body obtained by further applying the HIP process to this sintered body at a process temperature of 1050° C.

From the result of FIG. 3, the $CaF_2$ ceramics of Experimental Example 6 was transparent since few pores were included inside, and the mechanical strength was the highest since grain growth also hardly occurred.

In addition, the sintered body of the $CaF_2$ without additives was opaque since a large number of pores were included inside, and the mechanical strength was lower than that of the $CaF_2$ ceramics of Experimental Example 6.

In addition, the sintered body of the $CaF_2$ to which the HIP process at 1050° C. was applied was transparent since the pores having been included inside were almost removed, but the mechanical strength was the lowest since grain growth occurred.

Figure 4:
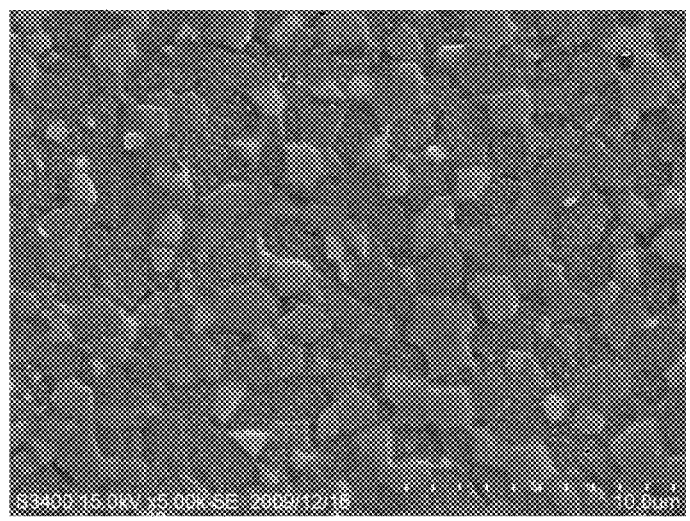
FIG. 4 is a photograph showing an internal microscopic structure of the $CaF_2$ ceramics obtained in Experimental Example 6.

FIG. 4 shows an internal microscopic structure of the $CaF_2$ ceramics of Experimental Example 6. From FIG. 4, in Experimental Example 6, because the sintering temperature was as extremely low as 800° C., it was confirmed that the grain size of the $CaF_2$ fine grains and the $DyF_3$ fine grains constituting the $CaF_2$ ceramics was as small as 1 to 2 μm and that grain growth hardly occurred.

[Base Material of White Phosphor]

Similarly to Experimental Example 18, 1 mass % CaS: Eu as the sulfide phosphor, 1 mass % SrS: Eu as the sulfide phosphor, and 1 mass % $Y_3(Al, Ga)_5O_{12}$: Ce (phosphor obtained by replacing part of Al of YAG: Ce with Ga) as the oxide phosphor were added to $CaF_2$ fine particles in which 1% $LaF_3$ fine particles and 1% $YbF_3$ fine particles were added, and ethanol was added and sufficiently mixed in a mortar. This mixture was dried, and from the dried mixed powder, a compact was produced. The compact was sintered for 1 hour at temperatures of 800 to 1000° C., and $CaF_2$ translucent ceramics having a thickness of 1 mm were produced.

This $CaF_2$ translucent ceramics were placed on a blue LED (trade name: OS-DP3-B1, main wavelength: 470 nm, manufactured by Mitsubishi Electric Osram Ltd.), and the rear surface of the $CaF_2$ translucent ceramics was irradiated with blue light to check emission. The result is shown in Table 3.

TABLE 3

|  | 800° C. | 850° C. | 900° C. | 950° C. | 1000° C. |
|---|---|---|---|---|---|
| CaS:Eu | RED | RED | RED | RED | PALE RED |
| SrS:Eu | RED | RED | RED | COLORLESS | COLORLESS |
| YA(Ga)G:Ce | WHITE | WHITE | WHITE | WHITE | WHITE |

From the result of Table 3, it was confirmed that the ceramics of which the sintering temperature was 950° C. or less among the ceramics in which CaS: Eu was added emitted fluorescence. On the other hand, it was confirmed that the ceramics of which the sintering temperature was 900° C. or less among the ceramics in which SrS: Eu was added emitted fluorescence. In addition, emission of bluish white fluorescence was confirmed from the ceramics in which $Y_3(Al, Ga)_5O_{12}$: Ce was added and of which the sintering temperature was 1000° C. or less.

Since the translucency of the sintered body ($CaF_2$ translucent ceramics) was the highest in the case that the sintering temperature was 800° C. and was lower in the case that the sintering temperature was higher than 800° C., the sintering condition of 800° C. and 1 hour was optimal.

Similarly to Experimental Example 18, 0.3 mass % CaS: Eu as the phosphor and 1 mass % YAG: Ce as the phosphor were added to $CaF_2$ fine particles in which 1% $LaF_3$ fine particles and 1% $YbF_3$ fine particles were added, and ethanol was added and sufficiently mixed in a mortar. This mixture was dried, and from the dried mixed powder, a compact was produced. The compact was sintered for 1 hour at 800° C., and $CaF_2$ translucent ceramics having a thickness of 1 mm was produced.

This $CaF_2$ translucent ceramics was placed on a blue LED (trade name: OS-DP3-B1, main wavelength: 470 nm, manufactured by Mitsubishi Electric Osram Ltd.), and the rear surface of the $CaF_2$ translucent ceramics was irradiated with blue light. Then, white fluorescence was emitted from the surface of the $CaF_2$ translucent ceramics. The total luminous flux of fluorescence from the $CaF_2$ translucent ceramics was measured using a LED evaluation system LCD-100 manufactured by SphereOptics LLC and a large-size integrating sphere.

In addition, as Comparative Example, similar total luminous flux measurement was also performed with respect to $CaF_2$ translucent ceramics produced by adding only 1 mass % YAG: Ce as the phosphor.

Figure 5:
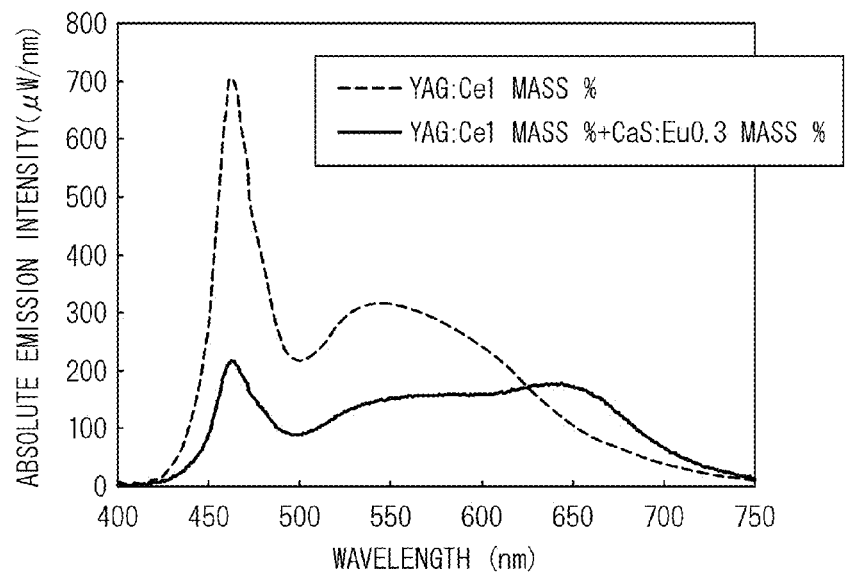
FIG. 5 is a graph showing a measurement result of the total luminous flux of fluorescence from $CaF_2$ translucent ceramics containing phosphor.

FIG. 5 shows the result of the total luminous flux measurement described above.

From the result of FIG. 5, xy chromaticity, color temperature (K), and color rendering index (Ra) were obtained. Table 4 shows the result.

TABLE 4

|  | x | y | COLOR TEMPERATURE (K) | COLOR RENDERING INDEX (Ra) |
|---|---|---|---|---|
| YAG:Ce | 0.298 | 0.336 | 7272 | 79.2 |
| YAG:Ce + CaS:Eu | 0.377 | 0.373 | 4061 | 93.9 |

From the result of Table 4, in the case that only YAG: Ce was added as the phosphor, because blue light emitted from the blue LED and yellow light emitted as fluorescence of the YAG: Ce were combined, and quasi white light was emitted from the surface of the $CaF_2$ translucent ceramics, the color temperature was high, and the color rendering index (Ra) was low.

On the other hand, in the case that CaS: Eu and YAG: Ce were added as the phosphor, the color rendering properties was improved since red emission was added at around 650 nm, the color temperature was reduced, and the color rendering index (Ra) was drastically improved.

[Laser Crystal]

Figure 6:
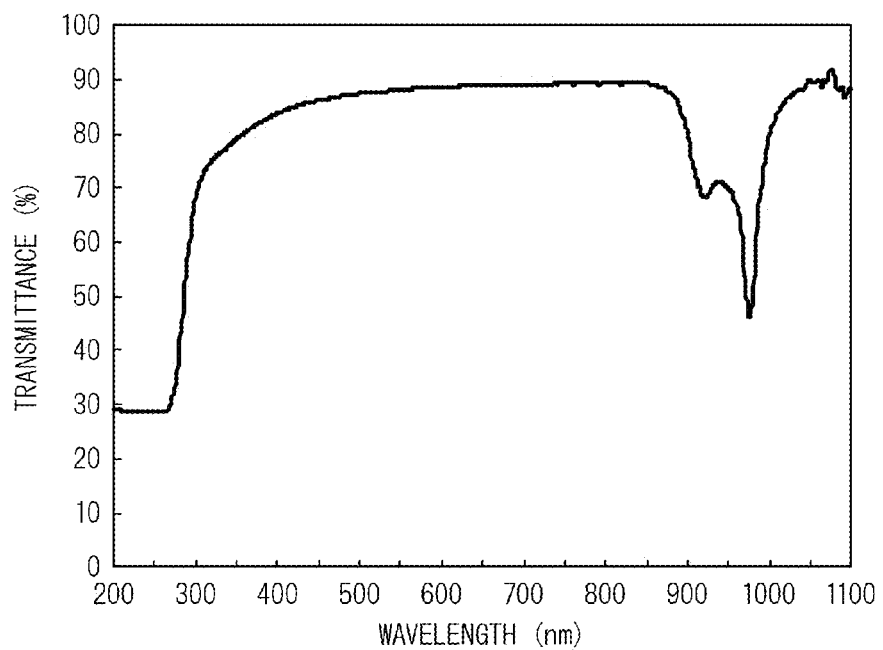
FIG. 6 is a graph showing a transmittance spectrum of the $CaF_2$ translucent ceramics of Experimental Example 20 produced by $CaF_2$ fine particles to which $LaF_3$ fine particles are added by 1% and $YbF_3$ fine particles are added by 3%.

FIG. 6 shows a transmittance spectrum of the $CaF_2$ translucent ceramics of Experimental Example 20 produced by $CaF_2$ fine particles added by 1% $LaF_3$ fine particles and 3% $YbF_3$ fine particles.

From FIG. 6, the $CaF_2$ translucent ceramics of Experimental Example 20 had a large absorption peak at around 970 nm.

Figure 7:
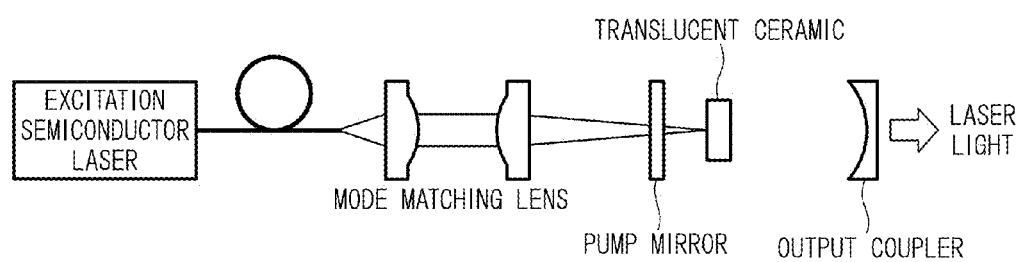
FIG. 7 is a configuration drawing schematically showing an optical system used to irradiate the $CaF_2$ translucent ceramics of Experimental Example 20 and Experimental Example 28 with excitation light.

In addition, by using an optical system shown in FIG. 7, the $CaF_2$ translucent ceramics of Experimental Example 20 was irradiated with excitation light having a wavelength of 976 nm, and laser light having a center wavelength of 1047 nm was emitted.

Figure 8:
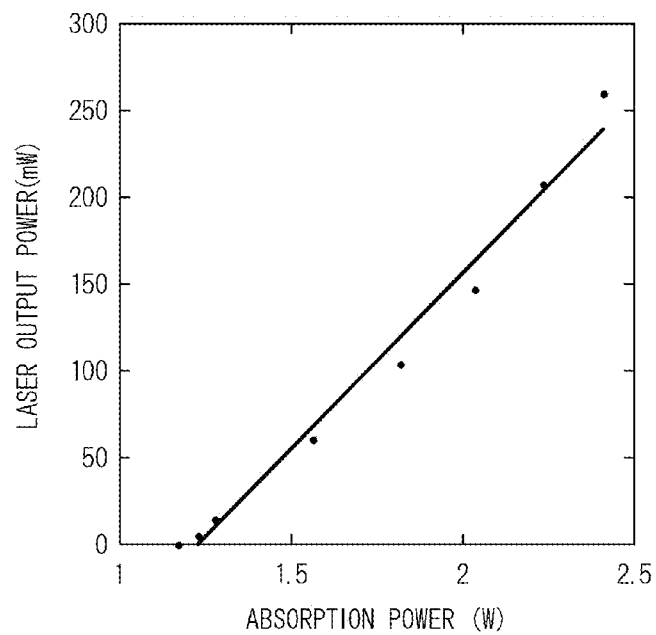
FIG. 8 is a graph showing a relationship between the absorption power of laser light emitted from the $CaF_2$ translucent ceramics of Experimental Example 20 and the laser output power.

In addition, as shown in FIG. 8, the relationship between the absorption power and the laser output power at this time was shown in a graph, and the ratio of the laser output power to the absorption power (slope efficiency) was 20.1%.

Figure 9:
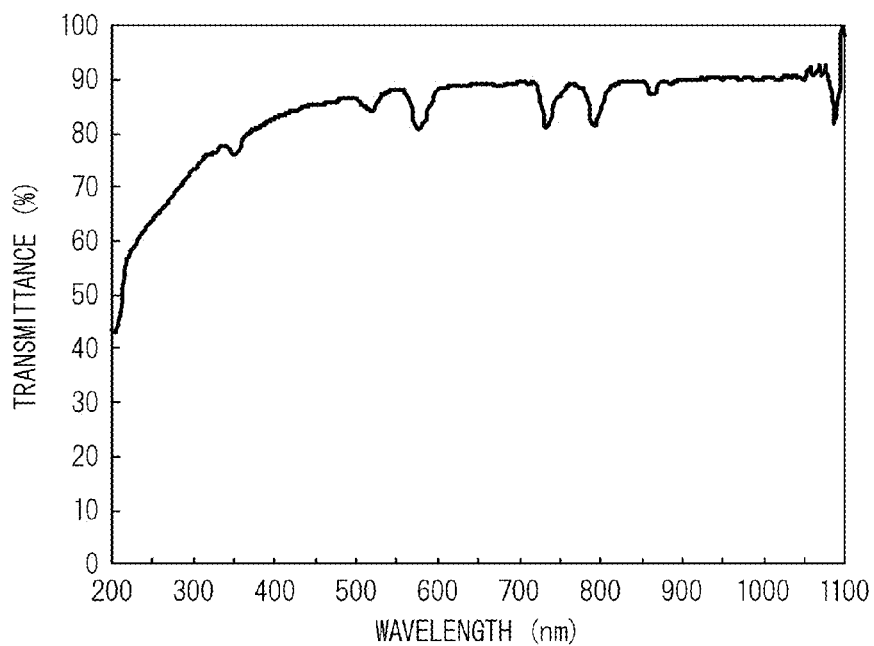
FIG. 9 is a graph showing a transmittance spectrum of the $CaF_2$ translucent ceramics of Experimental Example 28 produced by $CaF_2$ fine particles to which $LaF_3$ fine particles are added by 1% and $NdF_3$ fine particles are added by 0.5%.

FIG. 9 shows a transmittance spectrum of the $CaF_2$ translucent ceramics of Experimental Example 28 produced by $CaF_2$ fine particles added by 1% $LaF_3$ fine particles and 0.5% $NdF_3$ fine particles.

Figure 10:
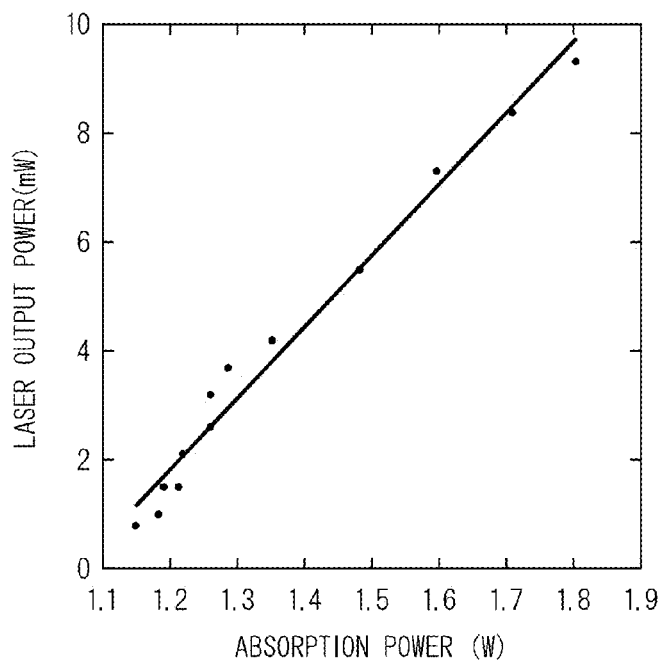
FIG. 10 is a graph showing a relationship between the absorption power of laser light emitted from the $CaF_2$ translucent ceramics of Experimental Example 28 and the laser output power.

In addition, by using an optical system shown in FIG. 7, the $CaF_2$ translucent ceramics of Experimental Example 28 was irradiated with excitation light having a wavelength of 790 nm, and laser light having a center wavelength of 1065.6 nm and a center wavelength of 1066.0 nm was emitted. As shown in FIG. 10, the relationship between the absorption power and the laser output power at this time was shown in a graph, and the ratio of the laser output power to the absorption power (slope efficiency) was 1.3%.

[Optical Constant]

The optical constants of the $CaF_2$ translucent ceramics of Experimental Example 19 and Experimental Example 28 were obtained. Table 5 shows the result.

TABLE 5

| EXPERIMENTAL EXAMPLE | nF | nd | nD | nC | ν d | ν D |
|---|---|---|---|---|---|---|
| 19 | 1.44153 | 1.43880 | 1.43877 | 1.43721 | 101 | 101 |
| 28 | 1.44085 | 1.43818 | 1.43814 | 1.43638 | 98 | 98 |

From the result of Table 5, it was clarified that the $CaF_2$ translucent ceramics of Experimental Example 19 and Experimental Example 28 had a low refractive index and low dispersion similar to those of a calcium fluoride single crystal.

Comparative Example

The ceramics were produced in the same condition as Experimental Example 1 except that the fine particles were obtained by adding and reacting hydrofluoric acid (hydrofluoric acid) to an aqueous solution in which calcium acetate and rare earth acetate of 1 mol % were simultaneously dissolved as an alternative to separately producing the $CaF_2$ fine particles and the $RF_3$ fine particles.

Rare earth acetates including Yb, La, Pr, Nd, Sm, Eu, Gd, Tb, Dy, Ho, Er, Tm, and Lu as the rare earth element were used.

As a result, it was impossible to obtain $CaF_2$ translucent ceramics with respect to all the rare earth element elements.

The $CaF_2$ translucent ceramics obtained at an extremely low sintering temperature of 800° C. according to aspects of the present invention can be applied to a variety of optical applications. In the case that the ceramics is used as a base material of white phosphor, high color rendering properties can be realized since it is possible to contain phosphor particles having low thermal durability. In addition, because it is possible to reduce the size of crystal grains by lowering the sintering temperate, it is also possible to achieve improved mechanical strength and thermal shock properties compared to conventional single crystal fluorite. By further performing the HIP process, the transparency is further enhanced, and a crystal quality capable of laser oscillation can be achieved. In addition, it is possible to use the ceramics as a lens material of low cost and high quality without using a single crystal.

What is claimed is:

1. A calcium rare earth fluoride translucent ceramic, comprising:
    Ca, R, and F, in an atomic ratio indicated by $(Ca_{1-x}R_x)F_{2+x}$, where R is at least two rare earth elements selected from a group consisting of La, Pr, Nd, Sm, Eu, Tb, Dy, Ho, Er, Tm, Yb, and Lu, and "x" is 0.002 to 0.059, wherein
    each of the at least two rare earth elements is in a concentration of 0.1 mol % to 5.8 mol % based on a total content of Ca and R,
    a total content of all rare earth elements in the ceramic is in a range of 0.2 mol % to 5.9 mol % based on a total content of Ca and all rare earth elements in the ceramic, and
    the calcium rare earth fluoride translucent ceramic has a thickness of at least 100 μm.

2. The calcium rare earth fluoride translucent ceramic according to claim 1, comprising at least one rare earth element selected from a group consisting of Pr, Nd, Sm, Eu, Tb, Dy, Ho, Er, Tm, and Yb.

3. The calcium rare earth fluoride translucent ceramic according to claim 1, further comprising phosphor particles.

4. The calcium rare earth fluoride translucent ceramic according to claim 3, wherein the phosphor particles are at least one selected from a group consisting of YAG: Ce, CaS: Eu, and SrS: Eu.

5. A method of manufacturing the calcium rare earth fluoride translucent ceramic according to claim 1, the method comprising:
    mixing calcium fluoride fine particles and rare earth fluoride fine particles produced separately from the calcium fluoride fine particles to prepare a fine particles mixture, the rare earth fluoride fine particles including first particulate fluorides of a first rare earth element and second particulate fluorides of a second rare earth element different from the first rare earth element; and sintering the fine particles mixture to make the fine particles mixture transparent, wherein the fine particles mixture is heated at a temperature of 750° C. to 900° C. to be primarily sintered and then is heated at a temperature of 700° C. to 1000° C. while being pressurized at a pressure of 500 kg/cm² to 3000 kg/cm² in an inert atmosphere to be secondarily sintered.

6. The method according to claim 5, wherein an average particle size of primary particles of the calcium fluoride fine particles is 200 nm or less, and an average particle size of primary particles of the rare earth fluoride fine particles is 100 nm or less.

7. The method according to claim 5, comprising:

reacting a calcium compound and a fluorine compound in an aqueous solution and then heating in a closed vessel at a temperature of 100° C. to 200° C. to produce the calcium fluoride fine particles.

8. The method according to claim 5, comprising:

reacting a rare earth compound and a fluorine compound in an aqueous solution and then heating in a closed vessel at a temperature of 100° C. to 200° C. to produce the rare earth fluoride fine particles.

9. The method according to claim 5, comprising:

performing wet mixing of the calcium fluoride fine particles and the rare earth fluoride fine particles to prepare the fine particles mixture.

10. The method according to claim 9, wherein the wet mixing is performed using a mechanical mixing unit.

11. The method according to claim 9, wherein in the wet mixing, cohesion force between primary particles in each of the calcium fluoride fine particles and the rare earth fluoride fine particles is chemically reduced.

12. The method according to claim 9, wherein in the wet mixing, cohesion force between primary particles in each of the calcium fluoride fine particles and the rare earth fluoride fine particles is mechanically reduced.

13. The method according to claim 11, wherein in the wet mixing, after cohesion force between primary particles in each of the calcium fluoride fine particles and the rare earth fluoride fine particles is reduced, an alkali solution is added to a suspension including the calcium fluoride fine particles and the rare earth fluoride fine particles, and then centrifugation is performed.

14. The method according to claim 13, wherein the alkali solution is an organic alkali solution.

15. An optical member, wherein a base material of the optical member is the calcium rare earth fluoride translucent ceramic according to claim 1.

16. An optical apparatus, comprising the optical member according to claim 15.

17. The calcium rare earth fluoride translucent ceramic according to claim 1, wherein the calcium rare earth fluoride translucent ceramic has a transmittance of at least 80% at a thickness of 3 mm for light having a wavelength of 550 nm.

* * * * *